(12) United States Patent
Ikebata et al.

(10) Patent No.: US 10,370,568 B2
(45) Date of Patent: Aug. 6, 2019

(54) DOUBLE-SIDED PRESSURE-SENSITIVE ADHESIVE TAPE FOR FIXING AIRCRAFT PARTS

(71) Applicant: THE NIPPON SYNTHETIC CHEMICAL INDUSTRY CO., LTD., Osaka (JP)

(72) Inventors: Akira Ikebata, Osaka (JP); Junichiro Sakai, Osaka (JP); Yuta Kawazoe, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 98 days.

(21) Appl. No.: 15/108,018

(22) PCT Filed: Dec. 24, 2014

(86) PCT No.: PCT/JP2014/084185
§ 371 (c)(1),
(2) Date: Jun. 24, 2016

(87) PCT Pub. No.: WO2015/098983
PCT Pub. Date: Jul. 2, 2015

(65) Prior Publication Data
US 2016/0326401 A1    Nov. 10, 2016

(30) Foreign Application Priority Data

Dec. 27, 2013    (JP) .................................. 2013-270938

(51) Int. Cl.
| | | |
|---|---|---|
| C09J 7/02 | (2006.01) |
| C09J 133/08 | (2006.01) |
| C09J 201/00 | (2006.01) |
| C09J 133/04 | (2006.01) |
| C09J 7/38 | (2018.01) |
| C09J 7/40 | (2018.01) |
| C09J 7/22 | (2018.01) |
| C09J 7/24 | (2018.01) |
| C09J 7/25 | (2018.01) |
| C09J 7/29 | (2018.01) |
| C09J 7/21 | (2018.01) |

(52) U.S. Cl.
CPC ............... *C09J 133/08* (2013.01); *C09J 7/21* (2018.01); *C09J 7/22* (2018.01); *C09J 7/241* (2018.01); *C09J 7/255* (2018.01); *C09J 7/29* (2018.01); *C09J 7/38* (2018.01); *C09J 7/385* (2018.01); *C09J 7/405* (2018.01); *C09J 133/04* (2013.01); *C09J 201/00* (2013.01); *C08L 2201/02* (2013.01); *C09J 2201/128* (2013.01); *C09J 2201/622* (2013.01); *C09J 2203/342* (2013.01); *C09J 2400/263* (2013.01); *C09J 2423/006* (2013.01); *C09J 2433/00* (2013.01); *C09J 2467/006* (2013.01)

(58) Field of Classification Search
None
See application file for complete search history.

(56) References Cited

U.S. PATENT DOCUMENTS

| | | | | |
|---|---|---|---|---|
| 4,439,482 A | * | 3/1984 | Suematsu ................. | D01F 6/92 442/60 |
| 5,198,299 A | * | 3/1993 | Kato ......................... | C09D 4/06 428/340 |
| 2003/0190464 A1 | * | 10/2003 | Narum ....................... | C09J 9/00 428/343 |
| 2013/0295329 A1 | | 11/2013 | Araki | |
| 2014/0093685 A1 | | 4/2014 | Araki | |

FOREIGN PATENT DOCUMENTS

| | | |
|---|---|---|
| JP | S59-086678 A | 5/1984 |
| JP | H04-500089 A | 1/1992 |
| JP | H05-37941 U | 5/1993 |
| JP | 2004-217833 A | 8/2004 |
| JP | 2009-138031 A | 6/2009 |
| JP | 2015-000984 A | 1/2015 |
| WO | 90/01411 A1 | 2/1990 |
| WO | 2009/072411 A1 | 6/2009 |

OTHER PUBLICATIONS

Takaomi, Hanai, et al., "Flame-Retardant Adhesive Tape", English translation of JP 11-189753A, published on Jul. 13, 1999. (Year: 1999).*
International Search Report issued with respect to Application No. PCT/JP2014/084185, dated Mar. 31, 2015.
International Preliminary Report issued with respect to Application No. PCT/JP2014/084185, dated Jun. 28, 2016.

* cited by examiner

*Primary Examiner* — Anish P Desai
(74) *Attorney, Agent, or Firm* — Greenblum & Bernstein, P.L.C.

(57) ABSTRACT

To provide a double-sided pressure-sensitive adhesive tape for fixing aircraft parts which is excellent in terms of hand tearability, flame retardance, and removability in a well-balanced manner. A double-sided pressure-sensitive adhesive tape for fixing aircraft parts which is a double-sided pressure-sensitive adhesive tape having pressure-sensitive adhesive layers on both sides of a substrate having hand tearability, characterized in that when S represents an pressure-sensitive adhesive strength of one pressure-sensitive adhesive layer (I) and W represents an pressure-sensitive adhesive strength of the other pressure-sensitive adhesive layer (II), the W is 2-20 N/25 mm and S/W is 1.5 or larger, and the double-sided pressure-sensitive adhesive tape passes the flammability test as provided for in FAR25.853 (a)app.F.Part1(a)(1)ii.

11 Claims, 1 Drawing Sheet

DOUBLE-SIDED PRESSURE-SENSITIVE ADHESIVE TAPE FOR FIXING AIRCRAFT PARTS

TECHNICAL FIELD

The present invention relates to a double-sided pressure-sensitive adhesive tape for fixing aircraft parts. More particularly, the invention relates to a double-sided pressure-sensitive adhesive tape which is excellent in terms of hand tearability, flame retardance, and removability and is suitable for use in fixing aircraft parts therewith.

BACKGROUND ART

Double-sided pressure-sensitive adhesive tapes are used for fixing parts in the fields of electrical, electronic, or OA appliances, home electrical appliances, aircrafts, ships, vehicles, etc.

As a result of the remarkable progress of investigations and applications of electronics and of semiconductor and magnetic-body technology in recent years, the high integrations, size reductions, and performance advancements in electrical, electronic, and OA appliances, etc. have been proceeding, and the risk of firing due to the elevated temperature and heat accumulation (thermal storage) inside such appliances is increasing. From the necessity of preventing such risk, the various components within the appliances and the parts used for bonding the components have come to be required to have a high level of flame retardance. Meanwhile, also in the fields of home electrical appliances, aircrafts, and the like, various investigations are being enthusiastically made on the flame-proofing of plastic materials, and adhesive materials to be used for fixing these materials have, of course, come to be required to have high flame retardance.

Especially in the field of aircrafts, among these, an exceedingly high level of flame retardance is required of even the adhesives and pressure-sensitive adhesives for use in fixing parts, etc. Furthermore, with respect to double-sided pressure-sensitive adhesive tapes for use in fixing the carpets and the like of aircrafts, from the standpoint of working efficiency, it is required to be able to be easily and cleanly torn by hand without using any edged tool. In addition, since parts such as carpets are periodically replaced, there is a desire for a double-sided pressure-sensitive adhesive tape that has pressure-sensitive adhesive properties sufficient for use but that can be easily removed at the time of replacement and does not cause the so-called adhesive remaining, which is the phenomenon in which a pressure-sensitive adhesive residue remains on the floor or wall after the removal.

As a double-sided pressure-sensitive adhesive tape having flame retardance, for example, in patent document 1, there is proposed a flame-retardant double-sided pressure-sensitive adhesive tape comprises: a substrate sheet in which a substrate sheet constituted of a nonwoven polyester fabric having a basis weight of 15-80 $g/m^2$ is impregnated with a composition for impregnation which includes a pressure-sensitive adhesive and an organic flame retardant of nitrogen system and which further contains a flame retardant that contains none of the halogens, antimony, and phosphorus; and pressure-sensitive adhesive layers coated on both sides of the substrate sheet respectively, the pressure-sensitive adhesive layers being constituted of a flame-retardant pressure-sensitive adhesive composition in which 20-200 parts by mass of a flame retardant that includes an organic flame retardant of nitrogen system but contains none of the halogens, antimony, and phosphorus is added to 100 parts by mass of an acrylic pressure-sensitive adhesive.

PRIOR-ART DOCUMENT

Patent Document

Patent Document 1: JP-A-2004-217833

SUMMARY OF THE INVENTION

Problem that the Invention is to Solve

However, double-sided pressure-sensitive adhesive tapes including a nonwoven fabric as the substrate, such as that proposed in patent document 1, seem to have satisfactory hand tearability, but, the removability of this kind of pressure-sensitive adhesive tapes is not considered at all, which are not usable as double-sided pressure-sensitive adhesive tapes for fixing parts used in aircrafts and periodically replaced.

An object of the invention is, under such circumstances, to provide a double-sided pressure-sensitive adhesive tape which is excellent in terms of hand tearability, flame retardance, and removability in a well-balanced manner and is suitable for use in applications where aircraft parts, e.g., aircraft carpets, are fixed therewith.

Means for Solving the Problem

The present inventors diligently made investigations under such circumstances. As a result, the inventors have discovered that a double-sided pressure-sensitive adhesive tape which is excellent in terms of not only hand tearability but also flame retardance and removability and which is suitable for use in fixing aircraft parts therewith is obtained by using, as the substrate of the double-sided pressure-sensitive adhesive tape, a substrate having hand tearability, such as, for example, a highly hand-tearable cloth material conventionally used as a curing tape or airtight tape, in particular, the cloth material including a flat yarn cloth, or an easy-to-tear film which has been conventionally used as a material for packages or soft packages of, for example, foods such as confectionery, chocolates, or candies. The invention has been thus completed.

The present invention includes the following configurations [1] to [12].

[1] A double-sided pressure-sensitive adhesive tape for fixing aircraft parts which is a double-sided pressure-sensitive adhesive tape having pressure-sensitive adhesive layers on both sides of a substrate having hand tearability, wherein when S represents an pressure-sensitive adhesive strength of one pressure-sensitive adhesive layer (I) and W represents an pressure-sensitive adhesive strength of the other pressure-sensitive adhesive layer (II), the W is 2-20 N/25 mm and S/W is 1.5 or larger, and the double-sided pressure-sensitive adhesive tape passes the flammability test as provided for in FAR25.853(a)app.F.Part1(a)(1)ii.

[2] The double-sided pressure-sensitive adhesive tape for fixing aircraft parts according to [1], wherein the substrate is an easy-to-tear film.

[3] The double-sided pressure-sensitive adhesive tape for fixing aircraft parts according to [2], wherein the easy-to-tear film is made of a material which is a polyester film or a polyolefin film.

[4] The double-sided pressure-sensitive adhesive tape for fixing aircraft parts according to [2] or [3], wherein the easy-to-tear film is a biaxially stretched film in which the transverse-direction stretch ratio is higher than the machine-direction stretch ratio.

[5] The double-sided pressure-sensitive adhesive tape for fixing aircraft parts according to [2] or [3], wherein the easy-to-tear film is a laminate of a biaxially stretched film and a monoaxially stretched film.

[6] The double-sided pressure-sensitive adhesive tape for fixing aircraft parts according to [1], wherein the substrate is a substrate which comprises a flat yarn cloth.

[7] The double-sided pressure-sensitive adhesive tape for fixing aircraft parts according to [6], wherein the substrate comprising a flat yarn cloth is a laminated film in which a flat yarn cloth and a plastic film are laminated.

[8] The double-sided pressure-sensitive adhesive tape for fixing aircraft parts according to any one of [1] to [7], wherein the pressure-sensitive adhesive layers each are a pressure-sensitive adhesive layer which comprises an acrylic resin (A).

[9] The double-sided pressure-sensitive adhesive tape for fixing aircraft parts according to any one of [1] to [8], wherein at least one of the pressure-sensitive adhesive layers (I) and (II) contains a flame retardant.

[10] The double-sided pressure-sensitive adhesive tape for fixing aircraft parts according to [9], wherein the content of the flame retardant is 70% by weight or less based on the total weight of the pressure-sensitive adhesive layers (I) and (II).

[11] The double-sided pressure-sensitive adhesive tape for fixing aircraft parts according to [9] or [10], wherein at least 90% of the entire flame retardant is contained in the pressure-sensitive adhesive layer (I).

[12] The double-sided pressure-sensitive adhesive tape for fixing aircraft parts according to any one of [1] to [11], wherein a release liner made of paper is coated on the surface of at least one of the pressure-sensitive adhesive layers, the surface is on the reverse side from the substrate, and the base paper of the release liner has a basis weight of 40-120 g/m².

Effects of the Invention

The double-sided pressure-sensitive adhesive tape for fixing aircraft parts of the invention is excellent in terms of hand tearability, flame retardance, and removability in a well-balanced manner.

Because of the excellent hand tearability, this double-sided pressure-sensitive adhesive tape can be easily torn by hand at any desired position along the tape transverse direction (TD) without using a tape cutter or the like, and the torn surfaces are in a clean state. Furthermore, there is no need of performing any modification of existing production equipment, any change in steps, etc., and this double-sided pressure-sensitive adhesive tape for fixing aircraft parts can hence be produced highly efficiently.

This double-sided pressure-sensitive adhesive tape has flame retardance which passes the flammability test as provided for in the United States Federal Aviation Administration fire resistance standards, 14 C.F.R. Part 25. Appendix F, Part I. Section (a) (1) (ii) (i.e., FAR25.853 (a)app.F.Part1(a)(1)ii (hereinafter sometimes referred to as "FAR25.853(a)app.F.Part1(a)(1)ii")), and is suitable for use as a double-sided pressure-sensitive adhesive tape for fixing aircraft parts.

MODES FOR CARRYING OUT THE INVENTION

The present invention will be explained below in detail, but the following explanations are merely on desirable embodiments.

In the invention, "(meth)acrylic" can mean acrylic or methacrylic, "(meth)acryloyl" can mean acryloyl or methacryloyl, and "(meth)acrylate" can mean acrylate or methacrylate. Furthermore, "acrylic resin" can mean a resin obtained by polymerizing a monomer ingredient including at least one kind of (meth)acrylic monomer.

First, the substrate having hand tearability is explained.

The configuration of the double-sided pressure-sensitive adhesive tape for fixing aircraft parts (hereinafter often referred to simply as "double-sided pressure-sensitive adhesive tape") of the invention is that pressure-sensitive adhesive layers are coated on both sides of the substrate having hand tearability.

The substrate having hand tearability is a substrate which, when cut to a width of 50 mm and then torn along the TD, does not elongate and can be torn at any desired position. Examples thereof include cloth materials, in particular, flat yarn cloths, laminated films in which a plastic film is laminated to a flat yarn cloth, and easy-to-tear films.

Examples of the cloth materials having hand tearability include rayon fabrics, cotton fabrics, polyester fabrics, fabrics comprising rayon/polyester blended yarns, nonwoven fabrics, and flat yarn cloths. Of these, flat yarn cloths are superior in having high machine-direction (MD) tensile strength.

A flat yarn cloth is a woven fabric produced by weaving flat yarns obtained by cutting a polyethylene or polypropylene film into strips and stretching the strips to impart strength thereto, which is called "flat yarn". Such woven fabrics to be used are ones in which the warp flat yarns and the weft flat yarns have been fixed to each other by thermal fusion bonding at the cross-points thereof so as to prevent yarn misalignment. Furthermore, a flat yarn cloth having hand tearability is one which has been made easy to tear along the TD by using longitudinal flat yarns which are thinner than the transverse flat yarns or by using the smaller number of flat yarns per unit length in the TD than in the MD, and which is difficult to tear along the MD. Another feature of flat yarn cloths having hand tearability is that the tensile strength thereof in the MD is high. A substrate reinforced by fibers which are not woven materials such as flat yarn cloths have an exceedingly low tensile strength as compared with woven cloths. For compensating the exceedingly low tensile strength, by laminating a biaxially stretched polyester film or biaxially stretched polypropylene film to such a substrate reinforced by fibers using an adhesive, the tensile strength of the substrate is improved. However, it becomes difficult to tear along the TD. In addition, the necessity of an adhesive for bonding the warp yarns to the weft yarns tends to result in an increase in the weight of the substrate.

Meanwhile, in cases when a cloth material is to be used as the substrate of a double-sided pressure-sensitive adhesive tape for fixing aircraft parts, it is preferable that the weight per unit area of the double-sided pressure-sensitive adhesive tape should be 300 g/m² or less and that the substrate also should be lightweight. Specifically, it is preferable that the weight per unit area of the substrate should be 200 g/m² or less, especially 100 g/m² or less.

Furthermore, it is preferred to use a substrate in which a flat yarn cloth and a plastic film are laminated, from the standpoint that stable pressure-sensitive adhesive strength and removability are obtained therewith. This is thought to be because this substrate can prevent the pressure-sensitive adhesive present on one side of the plastic film from passing through the substrate and mixing with the pressure-sensitive adhesive present on the other side, and can inhibit additives, such as a crosslinker, flame retardant, and plasticizer, in the pressure-sensitive adhesive layer present on one side of the plastic film from moving to the pressure-sensitive adhesive layer on the other side. In addition, the laminating of a flat yarn cloth and a plastic film brings about an improvement in hand tearability probably because cracking points are smoothly propagated, resulting in an improvement in the linearity of the torn surfaces.

It is preferable that the substrate in which a flat yarn cloth and a plastic film are laminated should also be lightweight. It is preferable that the plastic film should be a thin film, and the thickness of the plastic film is preferably 10-80 μm. The plastic film may be laminated to only one surface of the flat yarn cloth or may be laminated to both surfaces thereof. Preferred as a method for laminating the film to the flat yarn cloth is extrusion laminating, from the standpoints that no adhesive is used and that a reduction in weight is possible.

The thickness of the substrate including a flat yarn cloth is preferably 10-200 μm, especially preferably 50-100 μm, more preferably 60-90 μm. In case where the thickness thereof is too small, the occurrence of defects such as the generation of wrinkles during the production of the double-sided pressure-sensitive adhesive tape tends to increase, although the hand tearability improves. In case where the thickness thereof is too large, tearing this substrate tends to require higher force, resulting in a decrease in hand tearability, although the occurrence of defects during the production of the double-sided pressure-sensitive adhesive tape is reduced.

Meanwhile, it is preferred to use an easy-to-tear film as the substrate having hand tearability, from the standpoints that the entire double-sided pressure-sensitive adhesive tape can be reduced in weight and that stable pressure-sensitive adhesive strength and removability are obtained. In addition, the double-sided pressure-sensitive adhesive tape including an easy-to-tear film is preferred because this pressure-sensitive adhesive tape is excellent in terms of hand tearability and linear tear properties and can be torn with a small burden.

The term "easy-to-tear" in the invention has the following meaning. A film which itself, when examined for end tear resistance and distance of tearing deviation, has an end tear resistance of 45 N or less and a distance of tearing deviation of 6 mm/100 mm or less is defined as an "easy-to-tear" film. The end tear resistance and the distance of tearing deviation of a film itself can be measured in the same manners as the methods described in the Examples which will be given later. Synthetic papers also are a kind of film, and are easy-to-tear films so long as the synthetic papers have "easy-to-tear" in the meaning defined above.

The term "film" in the invention means a "filmy polymeric material having a thickness of 250 μm or less" as defined, for example, in JIS Z1707, and means such filmy material which has no fiber cross-points, entanglement, or the like such as those in woven fabrics or nonwoven fabrics and in which any portions collected from the layer show evenness in property. Consequently, the film of the invention is a flat film produced by slitting a film formed mainly from any of high-density polyethylene, polypropylene, and ethylene-based polymers and stretching the slit film, as provided for in JIS Z1533, and does not include the "flat yarn cloth" referred to as a ribbed film.

The easy-to-tear film to be used in the invention may be any film which satisfies the definition of "easy-to-tear" shown above. Specifically, the easy-to-tear film is a film having an end tear resistance of 45 N or less and a distance of tearing deviation of 6 mm/100 mm or less. A preferred range of the end tear resistance thereof is 44 N or less, and a preferred range of the distance of tearing deviation thereof is 5 mm/100 mm or less. Examples of conventionally known easy-to-tear films include the easy-to-tear films disclosed in, for example, JP-A-2013-18230, JP-A-2006-176128, JP-A-2008-189324, and JP-A-2000-345122 which satisfy the definition of "easy-to-tear" shown above. Specific examples of usable easy-to-tear films on the market are the trade names "TEARFINE" (manufactured by Toyobo Co., Ltd.), "TORAYFAN BO YT42" (manufactured by Toray Industries, Inc.), "TORAYFAN BO YT62" (manufactured by Toray Industries, Inc.), "YUPO MKS 40XX" (manufactured by Yupo Corporation), "Caralyan Y" (manufactured by Denki Kagaku Kogyo K.K.), "Caralyan YA2" (manufactured by Denki Kagaku Kogyo K.K.), and the like.

Such easy-to-tear films shown above have been films in extensive use as materials for packages or soft packages for foods, etc., and have been used as packaging materials in the form of laminates in which a low-density polyethylene film, unstretched polypropylene film, aluminum foil, film coated with vapor-deposited aluminum, or the like are thermally fused or are dry laminated. Consequently, persons skilled in the art have not usually conceived of using the easy-to-tear films as independent layers.

In addition, since packaging materials shown above are laminates with other films, the packaging materials in which easy tearprocessing e.g., formation of a notch or embossing is applied to the films are frequently used in order to impart easy openability (hand tearability) thereto. Because of this, as the purpose of the use of an easy-to-tear film, only linear tearproperty is expected, and the hand tearability of an easy-to-tear film has received little attention so far. In particular, the hand tearability of a double-sided pressure-sensitive adhesive tape including a release liner (release paper) applied thereto has not been investigated.

In applications where tensile strength is required, a synthetic paper having easy tearability can be used. The synthetic paper means a film having property of paper produced mainly from a synthetic resin. The synthetic paper is closely similar to wood pulp paper in appearance and texture but further has properties of synthetic resin films, such as water resistance. Although synthetic papers currently are used also in single-faced pressure-sensitive adhesive products, synthetic papers have not been used as the substrate of a double-sided pressure-sensitive adhesive tape required to have hand tearability. This is because ordinary synthetic papers do not have hand tearability and have been frequently used as products punched out into given shapes, such as, for example, labels, and use of a synthetic paper as the substrate of a double-sided pressure-sensitive adhesive tape has hence not received attention. Consequently, no investigations have been made on the hand tearability of a synthetic paper to which a release liner has been applied.

Examples of the material of the easy-to-tear film include polyester films, polyolefin films, polyamide films, and polyamide/polyolefin coextrusion films. Of these, polyester films and polyolefin films are preferred from the standpoints of the linearity of torn surfaces and the low tensile strength. In particular, polyolefin films are preferred from the standpoint of improvement of substrate flexibility and improvement of the pressure-sensitive adhesive property of the tape.

The easy-to-tear film is preferred as one which should be stretched, and may be either a monoaxially stretched film or a biaxially stretched film. However, from the standpoint of excellent hand tearability, it is preferable that the monoaxially stretched film should be a monoaxially stretched film in the TD and that the biaxially stretched film should be a biaxially stretched film in which the TD stretch ratio is higher than the MD stretch ratio. In the case of this biaxially stretched film, it is especially preferable that the TD stretch ratio should be 1.1-5 times, desirably 1.5-3 times higher than the MD stretch ratio.

It is preferable that the stretch ratio in the MD should be 2-10 times and the stretch ratio in the TD should be 2-10 times.

It is preferred that the easy-to-tear film should be a laminate of a biaxially stretched film and a monoaxially stretched film, from the standpoint that this laminate has excellent hand tearability. It is preferable that this biaxially stretched film should be a biaxially stretched film in which the TD stretch ratio is higher than the MD stretch ratio, as described above. Meanwhile, it is preferable that the monoaxially stretched film preferably should be a monoaxially stretched film in the TD.

Especially preferred of those easy-to-tear films are the following products from the standpoints of excellent processability during production of the double-sided pressure-sensitive adhesive tape and excellent hand tearability in a well-balanced manner: trade name "TEARFINE TF110" (manufactured by Toyobo Co., Ltd.; thickness, 14 µm), which is a biaxially stretched polyester film in which the TD stretch ratio is higher than the MD stretch ratio, and "TORAYFAN BO YT42" (manufactured by Toray Industries, Inc.; thickness, 25 µm), "TORAYFAN BO YT62" (manufactured by Toray Industries, Inc.; thickness, 40 µm), and "YUPO MKS 40XX" (manufactured by Yupo Corporation; 48 µm), which each are a laminated film in which a biaxially stretched polypropylene film and a uniaxially stretched polypropylene film.

The thickness of the easy-to-tear film is preferably 5-80 µm, especially preferably 8-70 µm, more preferably 10-60 µm. In case where the thickness thereof is too small, the occurrence of defects such as the generation of wrinkles during the production of the double-sided pressure-sensitive adhesive tape tends to increase, although the hand tearability improves. In case where the thickness thereof is too large, tearing this substrate tends to require higher force, resulting in a decrease in hand tearability, although the occurrence of defects during the production of the double-sided pressure-sensitive adhesive tape is reduced.

Next, the pressure-sensitive adhesive layers are explained.

The pressure-sensitive adhesive layers in the invention are layers obtained by curing a pressure-sensitive adhesive including any of various resins.

Examples of such resins serving as the base of the pressure-sensitive adhesive layers include acrylic resins, natural rubber, synthetic rubbers such as isoprene rubbers, styrene/butadiene copolymer rubbers (SBR), butadiene rubbers, isobutylene/isoprene rubbers, acrylic rubbers, acrylonitrile/butadiene copolymer rubbers, styrene/isoprene block copolymer rubbers (SIS), styrene/butadiene block copolymer rubbers (SBS), chloroprene rubbers, and butyl rubbers, and regenerated rubbers.

Of these, acrylic resins (A) are preferred from the standpoints that the resins are excellent in terms of weather resistance, removability, and heat resistance and that it is relatively easy to adjust the pressure-sensitive adhesive properties thereof.

An explanation is given below on the double-sided pressure-sensitive adhesive tape in which an acrylic resin (A) is used.

The acrylic resin (A) is a resin obtained by copolymerizing comonomer ingredients which include at least one (meth)acrylic acid alkyl ester monomer (a1) as a main component and which optionally include at least one functional-group-containing monomer (a2) and at least one other copolymerizable monomer (a3) as needed.

It is preferable that the (meth)acrylic acid alkyl ester monomer (a1) should be one in which the number of carbon atoms of the alkyl group is usually preferably 1-20, especially preferably 1-12, more preferably 1-8, more further preferably 4-8. Specific examples thereof include methyl (meth)acrylate, ethyl (meth)acrylate, n-butyl (meth)acrylate, iso-butyl (meth)acrylate, tert-butyl (meth)acrylate, n-propyl (meth)acrylate, n-hexyl (meth)acrylate, 2-ethylhexyl (meth)acrylate, n-octyl (meth)acrylate, iso-octyl acrylate, iso-decyl (meth)acrylate, lauryl (meth)acrylate, cetyl (meth)acrylate, stearyl (meth)acrylate, and iso-stearyl acrylate. These may be used alone or in combination of two or more thereof.

Preferred of these (meth)acrylic acid alkyl ester monomers (a1) are n-butyl (meth)acrylate and 2-ethylhexyl (meth)acrylate, from the standpoints of copolymerizability, pressure-sensitive adhesive property, handleability, and starting-material availability.

The content of the (meth)acrylic acid alkyl ester monomer (a1) in the comonomer ingredients is preferably 10-100% by weight, especially preferably 50-95% by weight, more preferably 70-95% by weight. In case where the content of the (meth)acrylic acid alkyl ester monomer (a1) is too low, the resultant acrylic resin, when used as a pressure-sensitive adhesive, tends to have reduced pressure-sensitive adhesive strength.

Examples of the functional-group-containing monomer (a2) include hydroxyl-group-containing monomers, carboxyl-group-containing monomers, amino-group-containing monomers, acetoacetyl-group-containing monomers, isocyanate-group-containing monomers, and glycidyl-group-containing monomers. Preferred of these are hydroxyl-group-containing monomers and carboxyl-group-containing monomers, from the standpoint that use of these monomers enables a crosslinking reaction to be conducted efficiently.

Examples of the hydroxyl-group-containing monomers include: hydroxyalkyl esters of acrylic acid, such as 2-hydroxyethyl (meth)acrylate, 4-hydroxybutyl (meth)acrylate, 5-hydroxypentyl (meth)acrylate, 6-hydroxyhexyl (meth)acrylate, and 8-hydroxyoctyl (meth)acrylate; caprolactone-modified monomers such as caprolactone-modified 2-hydroxyethyl (meth)acrylates; oxyalkylene-modified monomers such as diethylene glycol (meth)acrylate and polyethylene glycol (meth)acrylate; monomers containing a primary hydroxyl group, such as 2-acryloyloxyethyl-2-hydroxyethylphthalic acid; monomers containing a secondary hydroxyl group, such as 2-hydroxypropyl (meth)acrylate, 2-hydroxybutyl (meth)acrylate, and 3-chloro-2-hydroxypropyl (meth)acrylate; and monomers containing a tertiary hydroxyl group, such as 2,2-dimethyl-2-hydroxyethyl (meth)acrylate.

Especially preferred of these are 2-hydroxyethyl (meth) acrylate and 4-hydroxybutyl acrylate, from the standpoint of excellent reactivity with crosslinkers.

Examples of the carboxyl-group-containing monomers include (meth)acrylic acid, acrylic acid dimer, crotonic acid, maleic acid, maleic anhydride, fumaric acid, citraconic acid, glutaconic acid, itaconic acid, acrylamido-N-glycolic acid, and cinnamic acid. Preferred of these is (meth)acrylic acid.

Examples of the amino-group-containing monomers include tert-butylaminoethyl (meth)acrylate, ethylaminoethyl (meth)acrylate, dimethylaminoethyl (meth)acrylate, and diethylaminoethyl (meth)acrylate.

Examples of the acetoacetyl-group-containing monomers include 2-(acetoacetoxy)ethyl (meth)acrylate and allyl acetoacetate.

Examples of the isocyanate-group-containing monomers include 2-acryloyloxyethyl isocyanate, 2-methacryloyloxyethyl isocyanate, and alkylene oxide adducts of these.

Examples of the glycidyl-group-containing monomers include glycidyl (meth)acrylate and allylglycidyl (meth) acrylate.

These functional-group-containing monomers (a2) may be used alone or in combination of two or more thereof.

The content of the functional-group-containing monomer (a2) in the comonomer ingredients is preferably 0.01-30% by weight, especially preferably 0.05-10% by weight, more preferably 0.1-10% by weight, even more preferably 2-5% by weight. In case where the content of the functional-group-containing monomer (a2) is too low, the resultant acrylic resin tends to have reduced cohesive force and hence reduced durability. In case where the content thereof is too high, there is a tendency that a viscosity becomes high and the stability of the resin is reduced.

Examples of the other copolymerizable monomer (a3) include: (meth)acrylate compounds containing an alicyclic structure, such as cyclohexyl (meth)acrylate and isobornyl (meth)acrylate; monomers containing one aromatic ring, such as phenyl (meth)acrylate, benzyl (meth)acrylate, phenoxyethyl (meth)acrylate, phenyldiethylene glycol (meth) acrylate, 2-hydroxy-3-phenoxypropyl (meth)acrylate, styrene, and α-methylstyrene; (meth)acrylic acid ester monomers containing a biphenyloxy structure, such as biphenyloxyethyl (meth)acrylate; (meth)acrylamide monomers such as ethoxymethyl(meth)acrylamide, n-butoxymethyl(meth)acrylamide, (meth)acryloylmorpholine, dimethyl(meth)acrylamide, diethyl(meth)acrylamide, and (meth) acrylamido-N-methylol(meth)acrylamide; monomers containing an alkoxy group or oxyalkylene group, such as 2-methoxyethyl (meth)acrylate, 2-ethoxyethyl (meth)acrylate, methoxydiethylene glycol (meth)acrylate, ethoxydiethylene glycol (meth)acrylate, methoxypolyethylene glycol (meth)acrylate, and polypropylene glycol mono(meth)acrylate; and acrylonitrile, methacrylonitrile, vinyl acetate, vinyl propionate, vinyl stearate, vinyl chloride, vinylidene chloride, alkyl vinyl ethers, vinyltoluene, vinylpyridine, vinylpyrrolidone, itaconic acid dialkyl esters, fumaric acid dialkyl esters, allyl alcohol, acrylic chloride, methyl vinyl ketone, allyltrimethylammonium chloride, and dimethylallyl vinyl ketone.

Preferred of these are (meth)acrylate compounds containing an alicyclic structure, from the standpoint of excellent pressure-sensitive adhesive strength to low polar adherends.

The content of the other copolymerizable monomer (a3) in the comonomer ingredients is preferably 0-40% by weight, especially preferably 0-30% by weight, more preferably 0-25% by weight. In case where the content of the other copolymerizable monomer (a3) is too high, there is a tendency that the desired pressure-sensitive adhesive properties are difficult to obtain.

By polymerizing the (meth)acrylic acid alkyl ester monomer (a1), preferably the functional-group-containing monomer (a2) and the other copolymerizable monomer (a3) as needed, as comonomer ingredients, an acrylic resin (A) is produced. It is preferable that this polymerization should be solution polymerization, from the standpoint that the acrylic resin (A) can be safely and stably produced using any desired monomer composition.

For example, this solution polymerization may be performed by mixing or dropping monomer ingredients including the (meth)acrylic acid alkyl ester monomer (a1), functional-group-containing monomer (a2), and other copolymerizable monomer (a3) and a polymerization initiator with or into an organic solvent and polymerizing the monomer ingredients under a refluxing condition or at 50-98° C. for 0.1-20 hours.

Specific examples of the polymerization initiator include ordinary radical polymerization initiators such as azo type polymerization initiators, e.g., azobisisobutyronitrile and azobisdimethylvaleronitrile, and peroxide type polymerization initiators, e.g., benzoyl peroxide, lauroyl peroxide, di-tert-butyl peroxide, and cumene hydroperoxide.

The weight-average molecular weight of the acrylic resin (A) is usually 100,000-5,000,000, preferably 300,000-1,500,000, especially preferably 500,000-900,000. Too low weight-average molecular weights thereof tend to result in a decrease in durability, while too high weight-average molecular weights thereof tend to render the production difficult.

The dispersity ratio [(weight-average molecular weight)/(number-average molecular weight)] of the acrylic resin (A) is preferably 20 or less, especially preferably 15 or less, more preferably 10 or less, even more preferably 7 or less. In case where the dispersity ratio thereof is too high, the durability of pressure-sensitive adhesive layers tends to reduce and bubbles or the like are prone to occur. A lower limit of the dispersity ratio is usually 1.1 from the standpoint of limitations in production.

A glass transition temperature of the acrylic resin (A) should be preferably −80 to 10° C., especially preferably −70 to −10° C., more preferably −65 to −20° C. Too high glass transition temperatures thereof tend to result in insufficient tack, while too low glass transition temperatures thereof tend to result in a decrease in heat resistance.

The weight-average molecular weight is a weight-average molecular weight calculated for standard polystyrene molecular weight, which is determined through a measurement with high-performance liquid chromatography ("Waters 2695 (apparatus main body)" and "Waters 2414 (detector)", both manufactured by Nihon Waters K.K.) in which three columns Shodex GPC KF-806L (exclusion limit molecular weight, $2\times10^7$; separation range, 100 to $2\times10^7$; number of theoretical plates, 10,000 per column; material of column packing, styrene/divinylbenzene copolymer; particle diameter of the column packing, 10 μm) are used in a serially connected state. For the number-average molecular weight, the same method can be used. The dispersity ratio is determined from the weight-average molecular weight and the number-average molecular weight. The glass transition temperature is calculated using the following Fox equation.

$$\frac{1}{Tg} = \frac{Wa}{Tga} + \frac{Wb}{Tgb} + \ldots + \frac{Wn}{Tgn} \qquad \text{[Math. 1]}$$

Tg: glass transition temperature (K) of the copolymer
Tga: glass transition temperature (K) of homopolymer of monomer A
  Wa: weight fraction of monomer A
Tgb: glass transition temperature (K) of homopolymer of monomer B
  Wb: weight fraction of monomer B
Tgn: glass transition temperature (K) of homopolymer of monomer N
  Wn: weight fraction of monomer N
(Wa+Wb+ . . . +Wn=1)

It is preferable that the acrylic resin (A) should be crosslinked with a crosslinker and cured to be pressure-sensitive adhesive layers.

Examples of the crosslinker include isocyanate-based crosslinkers, metal chelate-based crosslinkers, epoxy-based crosslinkers, metal salt-based crosslinkers, metal alkoxide-based crosslinkers, aldehyde-based crosslinkers, amino-based crosslinkers which are not amino resins, urea-based crosslinkers, melamine-based crosslinkers, and aziridine-based crosslinkers. Preferred examples among these include isocyanate-based crosslinkers and epoxy-based crosslinkers.

The amount of the crosslinker to be used is preferably 0.01-10 parts by weight, especially preferably 0.01-5 parts by weight, per 100 parts by weight of the acrylic resin (A). In case where the content thereof is too small, the pressure-sensitive adhesive layers tend to have reduced cohesive force and be susceptible to shearing. In case where the amount thereof is too large, the crosslinking reaction tends to proceed excessively, resulting in a decrease in pressure-sensitive adhesive strength.

In the case where the crosslinker is an isocyanate-based crosslinker, the use amount thereof per 100 parts by weight of the acrylic resin (A) is preferably 0.1-10 parts by weight, especially preferably 0.2-5 parts by weight. In case where the crosslinker is an epoxy-based crosslinker, the use amount thereof per 100 parts by weight of the acrylic resin (A) is preferably 0.01-1 part by weight, especially preferably 0.01-0.5 parts by weight.

The pressure-sensitive adhesive layers may contain a tackifier, ultraviolet absorber, antioxidant, plasticizer, pigment, stabilizer, filler, etc., besides the base resin, e.g., the acrylic resin (A), and the crosslinker.

Examples of the tackifier include rosin-based resins, terpene-based resins, xylene-based resins, phenolic resins, coumarone-based resins, and petroleum resins. In the case where the base resin is an acrylic resin, preferred tackifiers are rosin-based resins, terpene-based resins, and xylene-based resins. In the case where the base resin is a rubber-based resin, preferred tackifiers are rosin-based resins, terpene-based resins, and petroleum-based resins.

Although the double-sided pressure-sensitive adhesive tape of the invention has at least two pressure-sensitive adhesive layers, the two pressure-sensitive adhesive layers may be equal to each other or may be different kind of or different composition of pressure-sensitive adhesive layers. It is, however, preferable that the double-sided pressure-sensitive adhesive tape of the invention should be one in which there is a difference in pressure-sensitive adhesive strength between the two surfaces and in composition between the pressure-sensitive adhesive layers.

The thickness of each of the pressure-sensitive adhesive layer is preferably 5-200 μm, especially preferably 10-150 μm, more preferably 15-130 μm.

In case where the thickness thereof is too large, the tape tends to have an increased weight. In case where the thickness thereof is too small, sufficient pressure-sensitive adhesive strength tends not to be obtained.

It is preferable that the pressure-sensitive adhesive layers should have a gel fraction of 20-90%.

In case where the gel fraction thereof is higher than the preferred range, a decrease in pressure-sensitive adhesive strength tends to result. In case where the gel fraction thereof is lower than the preferred range, there is a tendency that the pressure-sensitive adhesive layers have a reduced cohesive force, making it difficult to obtain the desired pressure-sensitive adhesive strength.

The gel fraction is a criterion of the degree of crosslinking (degree of curing), and is calculated, for example, in the following manner. A pressure-sensitive adhesive tape obtained by forming a pressure-sensitive adhesive layer on a polymer film (e.g., poly(ethylene terephthalate) film) serving as a substrate (the pressure-sensitive adhesive tape having no separator) is wrapped in 200-mesh SUS wire mesh and immersed in toluene at 23° C. for 24 hours. The content in weight percentage of the insoluble components of the pressure-sensitive adhesive which remain within the wire mesh is taken as the gel fraction. The weight of the substrate is subtracted beforehand.

The pressure-sensitive adhesive layers each have a pressure-sensitive adhesive strength of preferably 0.5-100 N/25 mm, especially preferably 1-80 N/25 mm, more preferably 2-70 N/25 mm.

In case where the pressure-sensitive adhesive strength is increased beyond that range, there is a tendency that the thickness of the pressure-sensitive adhesive layer is increased, resulting in an increase in the weight of the tape. In case where the pressure-sensitive adhesive strength thereof is too low, there is a tendency that sufficient adhesive strength is not obtained and the fixed member is prone to fall off.

The pressure-sensitive adhesive strength is measured in accordance with JIS Z0237. Specifically, the pressure-sensitive adhesive strength can be measured by the method described in the Examples which will be given later.

Since the test specimen is a double-sided tape, the pressure-sensitive adhesive surface which is not tested can be covered with poly(ethylene terephthalate) film "Lumirror S10 (manufactured by Toray Industries, Inc.)" having a nominal thickness of No. 25, as provided for in JIS C 2318, when making the measurement as in the Examples which will be given later.

Although the double-sided pressure-sensitive adhesive tape of the invention is obtained by forming the pressure-sensitive adhesive layer on each of both sides of a substrate having hand tearability, it is necessary that at least either of the pressure-sensitive adhesive layers should contain a flame retardant. Addition of a flame retardant to the substrate tends to result in a decrease in the strength of the substrate, an increase in the weight of the substrate, and a decrease in tearability, and tends to increase in the cost of the substrate economically.

The flame retardant is explained next.

The flame retardant to be used in the invention may be any of known flame retardants generally used as the retardant for pressure-sensitive adhesives. Examples thereof include halogen-based flame retardants, combinations of a halogen-based flame retardant and antimony trioxide, phosphorousbased flame retardants, metal hydroxyl-based flame retardants, metal phosphinate-based flame retardants, nitrogen-containing compounds such as melamine cyanurate and triazine compounds, and poly sodium phosphate.

Examples of the halogen-based flame retardants include: bromine-based flame retardants such as tetrabromobisphenol A, hexabromocyclodecane, dibromodiphenyl oxide, tetrabromobisphenol A polycarbonate oligomers, brominated polystyrene, and ethylenebis(tetrabromophthalimide); chlorine-based flame retardants such as chlorinated paraffins and perchlorocyclopentadecane; halogen-containing phosphoric esters such as tris(tribromoneopentyl) phosphate and tris(chloropropyl) phosphate; and halogen-containing condensed phosphate esters such as trade name "CR-504L", "CR-570", and "DAIGUARD-540", manufactured by Daihachi Chemical Industry Co., Ltd.

Examples of the phosphorus-based flame retardants include: halogen-free phosphoric esters such as trimethyl phosphate, triethyl phosphate, triphenyl phosphate, tricresyl phosphate, trixylenyl phosphate, cresyl diphenyl phosphate, 2-naphthyl diphenyl phosphate, and cresyl di-2,6-xylenyl phosphate; aromatic condensed phosphate esters such as trade names "CR-733S", "CR-741", and "PX-200", manufactured by Daihachi Chemical Industry Co., Ltd.; and halogen-free condensed phosphate esters such as trade names "DAIGUARD-580", "DAIGUARD-610", and "DAIGUARD-880", manufactured by Daihachi Chemical Industry Co., Ltd.

Examples of the metal hydroxyl-based flame retardants include magnesium hydroxide and aluminum hydroxide.

Examples of the metal phosphinate-based flame retardants include trade names "Exolit OP1230" and "Exolit OP930", manufactured by Clariant AG.

One or more flame retardants to be used may be selected from among those flame retardants so that the double-sided pressure-sensitive adhesive tape to be finally obtained using the flame retardants passes the flammability test as provided for in FAR25.853(a)app.F.Part1(a)(1)ii. In view of the recent environmental regulations in Europe and from the standpoint of the ability to ensure flame retardance without causing a decrease in pressure-sensitive adhesive property, halogen-based flame retardants are preferred. Especially preferred are halogen-containing phosphoric esters and halogen-containing condensed phosphate esters. More preferred are halogen-containing condensed phosphate esters, since these esters are powdery at ordinary temperature and easy to handle and exert little influence on the pressure-sensitive adhesive properties. Even more preferred is tris(tribromoneopentyl) phosphate.

Meanwhile, since there are cases where halogen-based flame retardants generate toxic halogen gases upon combustion or corrode metals, there also is a desire for a flame-retardant double-sided tape containing no halogen-based flame retardant.

In the case where one or more flame retardants other than halogen-based flame retardants are used, a synergistic effect is obtained by using, in combination, flame retardants which function by different mechanisms, rather than using one flame retardant alone. Preferred is a combination of any of the halogen-free phosphoric esters or halogen-free condensed phosphate esters shown above as examples with any of the metal hydroxyl salts shown above as examples. Especially preferred is a combination of any of the halogen-free condensed phosphate esters with aluminum hydroxide, because this combination causes little decrease in pressure-sensitive adhesive property and brings about excellent flame retardance.

The content of the flame retardant is preferably 10-70% by weight, especially preferably 15-60% by weight, more preferably 20-50% by weight, based on the total amount of the acrylic resin (A) which constitutes both pressure-sensitive adhesive layers of the double-sided pressure-sensitive adhesive tape.

In case where the content thereof is too high, there is a tendency that the pressure-sensitive adhesive properties decrease or the weight of the tape is too large. Too low contents thereof tend to result in a decrease in flame retardance.

In the case where the flame retardant is a halogen-containing phosphoric ester or a halogen-containing condensed phosphate ester, the content thereof is preferably 10-50% by weight, especially preferably 10-40% by weight, more preferably 10-25% by weight. In the case where the flame retardant is a halogen-free flame retardant, the content thereof is preferably 10-70% by weight, especially preferably 15-50% by weight, more preferably 15-40% by weight.

It is preferable that the flame retardant should be contained in a larger amount in the pressure-sensitive adhesive layer (I), from the standpoints that the double-sided pressure-sensitive adhesive tape in this configuration is apt to exhibit the flame retardance and that the pressure-sensitive adhesive strength thereof is stably exhibited. It is preferable that at least 90% of the entire flame retardant should be contained in the pressure-sensitive adhesive layer (I), and it is more preferable that at least 95% thereof should be contained in the pressure-sensitive adhesive layer (I). Especially preferably, the entire flame retardant is contained in the pressure-sensitive adhesive layer (I).

Finally, the double-sided pressure-sensitive adhesive tape for fixing aircraft parts is explained.

In the double-sided pressure-sensitive adhesive tape for fixing aircraft parts of the invention, the total weight per unit area of the substrate and the pressure-sensitive adhesive layers is preferably 300 g/m$^2$ or less, more preferably 200 g/m$^2$ or less, especially preferably 180 g/m$^2$ or less, even more preferably 160 g/m$^2$ or less.

A lower limit of the total weight is usually 50 g/m$^2$.

The thickness of the double-sided pressure-sensitive adhesive tape of the invention is preferably 15-320 µm, especially preferably 30-200 µm, more preferably 40-180 µm.

In case where the thickness thereof is too large, this double-sided pressure-sensitive adhesive tape tends to have a weight which exceeds a weight limit for use in aircrafts. In case where the thickness thereof is too small, there is a tendency that sufficient flame retardance, pressure-sensitive adhesive properties, and adhesive strength are not obtained.

The proportion of the total thickness of the two pressure-sensitive adhesive layers of the double-sided pressure-sensitive adhesive tape to the thickness of the substrate thereof ((pressure-sensitive adhesive layers)/substrate) is preferably 0.1-50, especially preferably 0.2-25, more preferably 0.5-15.

In case where the proportion thereof is too small, the pressure-sensitive adhesive layers are too thin to the substrate and there is hence a tendency that sufficient pressure-sensitive adhesive strength cannot be obtained. In case where the proportion thereof is too large, the pressure-sensitive adhesive layers are too thick to the substrate and there is hence a tendency of difficulties in production due to, for example, the generation of bubbles in the pressure-sensitive adhesive layers during drying, and of resulting in an increase in cost. Meanwhile, by forming the two pressure-sensitive adhesive layers so as to differ in thickness, the pressure-sensitive adhesive strength of the two surfaces can differ.

For producing the double-sided pressure-sensitive adhesive tape, known or common methods for producing a double-sided pressure-sensitive adhesive tape may be used. For example, the double-sided pressure-sensitive adhesive tape can be produced by: a method in which a pressure-sensitive adhesive is applied to one side of a substrate having hand tearability and dried, after that a release liner is superposed on the surface of the pressure-sensitive adhesive layer thus formed; or a method in which a pressure-sensitive adhesive is applied to one surface of a release liner and dried, after that a substrate having hand tearability is superposed on the surface of the pressure-sensitive adhesive layer thus formed.

Before a pressure-sensitive adhesive layer is coated on a substrate having hand tearability, a known or common surface treatment such as a physical treatment, e.g., corona discharge treatment or plasma treatment, or a chemical treatment, e.g., priming, may be suitably given to the surface of the substrate having hand tearability.

Examples of the release liner include: plastic films made of plastics such as polyolefin-based resins, e.g., polyethylene, polyester-based resins, e.g., poly(ethylene terephthalate), vinyl acetate-based resins, polyimide-based resins, fluororesins, and cellophane; paper such as kraft paper and Japanese paper; rubber sheets made of natural rubber, butyl rubbers, and the like; foam sheets obtained by foaming polyurethanes, polychloroprene rubbers, etc.; metal foils such as aluminum foils and copper foils; and composites of these. These release liners each may be one in which one or both surfaces thereof have undergone a surface treatment, e.g., corona treatment.

Other examples of the release liner include: laminated paper in which a film of polyethylene or the like is laminated to glassine paper, kraft paper, or clay-coated paper; coated paper to which paper with a resin such as polyvinyl alcohol or an acrylic ester copolymer is coated; and something in which a fluororesin, silicone resin, or the like as a release agent is applied to, for example, films of synthetic resins such as polyesters and polypropylene.

Preferred of these are release liners made of paper, from the standpoint that such release liners are easy to tear by hand. Especially preferred is a paper release liner in which the base paper has a basis weight of 40-120 g/m$^2$ (preferably 50-80 g/m$^2$). The thickness of this release liner is preferably 40-180 μm, especially 60-140 μm, more preferably 80-120 μm. In case where the thickness thereof is too small, there is a tendency that production thereof is difficult due to, for example, the occurrence of wrinkles during winding-up. Too large thicknesses thereof tend to result in a decrease in hand tearability.

In the case where release liners are to be superposed on the pressure-sensitive adhesive layers of the double-sided pressure-sensitive adhesive tape, it is preferable that the release liners which are superposed respectively on the two surfaces should be selected so as to differ in release liner peel force, from the standpoint of improving application efficiency. For example, an improvement in application efficiency is attained in cases when release liners are selected so that the release liner on the surface of the double-sided pressure-sensitive adhesive tape which is stuck first has a lower peel force than the release liner on the surface which is stuck next.

For applying a composition forming the pressure-sensitive adhesive to any of various sheet-shaped substrates, coating devices in common use may be used. Examples thereof include a knife over roll coater, die coater, roll coater, bar coater, gravure coater, reverse-roll coater, dipping, and blade coater.

With respect to drying conditions, it is adopted such conditions that the solvent and residual monomers contained in the pressure-sensitive adhesive are dried and removed during the drying and, in the case where a crosslinker has been used, the functional groups possessed by the base resin can react with the crosslinker to form a crosslinked structure. Preferred drying conditions include, for example, 60-120° C. and about 1-5 minutes. After the drying, the pressure-sensitive adhesive layer can be after-cured in the state of being held between layers of the sheet-shaped substrate, thereby allowing the crosslinking reaction to proceed further.

The double-sided pressure-sensitive adhesive tape of the invention may be in a roll form or in the form of flat sheets, or may have been processed into other various shapes.

In the case where the double-sided pressure-sensitive adhesive tape is in the form of flat sheets, it is preferable that a release liner should be coated on the surface of each of the two pressure-sensitive adhesive layers. In the case of a roll form, it is preferred to dispose a release liner on the surface of only one of the two pressure-sensitive adhesive layers.

It is preferable that the double-sided pressure-sensitive adhesive tape of the invention should have high tensile strength. The double-sided pressure-sensitive adhesive tape is required to have such a degree of strength that the double-sided pressure-sensitive adhesive tape is not torn when stretched for application to a floor or wall in order to prevent distortion or when peeled off in order to redo the application or when stretched in order to peel off the double-sided pressure-sensitive adhesive tape after use. It is preferable that the tensile strength of the double-sided pressure-sensitive adhesive tape should be 20 N/25 mm or higher, preferably 30 N/25 mm or higher, more preferably 50 N/25 mm or higher. An upper limit of the tensile strength thereof is usually 150 N/25 mm. A double-sided pressure-sensitive adhesive tape having a high tensile strength can be attained by using, an easy-to-tear film which itself has a tensile strength that is equal to or higher than the intended tensile strength of the double-sided pressure-sensitive adhesive tape of the substrate film.

The adherends to which the double-sided pressure-sensitive adhesive tape for fixing aircraft parts of the invention is applied are aircraft parts. Examples of the aircraft parts include carpets, flooring parts, and wall parts.

Especially suitable are carpets or flooring parts.

Examples of the carpets include known or common carpets for use in aircrafts. Specific examples thereof include carpets employing nylon fibers or olefin fibers.

Examples of the flooring parts include metal alloys such as aluminum alloys and titanium alloys, composite materials configured of reinforcing glass fibers and an epoxy resin, and composite materials configured of reinforcing glass fibers and a phenolic resin.

With respect to combinations of aircraft parts to be bonded to each other using the tape, the tape is suitable for use in bonding a flooring part and a carpet or the like.

In cases when a double-sided pressure-sensitive adhesive tape is used in the application when bonding and fixing a carpet and a flooring part, it is preferable that at the time of carpet replacement, the pressure-sensitive adhesive surface which is adherent to the carpet does not peel off the carpet and the pressure-sensitive adhesive surface which is adherent to the floor is peeled from the floor without leaving any adhesive residue thereon. It is important that if the pressure-sensitive adhesive surface adherent to the carpet peels off the carpet at the time of carpet replacement and the double-sided pressure-sensitive adhesive tape remains on the floor surface, then the pressure-sensitive adhesive surface adherent to the floor surface should be peeled from the floor without leaving any adhesive residue thereon and the double-sided pressure-sensitive adhesive tape should have such a strength that the double-sided pressure-sensitive adhesive tape is not torn when peeled from the floor surface.

It is therefore preferable that the double-sided pressure-sensitive adhesive tape for use in that application should be one in which the pressure-sensitive adhesive on the side to be applied to the carpet has an exceedingly high pressure-sensitive adhesive strength and the pressure-sensitive adhesive on the side to be applied to the floor has a pressure-sensitive adhesive strength of about 10 N/25 mm to enable the double-sided pressure-sensitive adhesive tape to moderately stick to the floor surface and to be capable of being peeled off at the time of carpet replacement without leaving any adhesive residue.

Specifically, in the double-sided pressure-sensitive adhesive tape of the invention, when S represents an pressure-sensitive adhesive strength of one pressure-sensitive adhesive layer (I) and W represents an pressure-sensitive adhesive strength of the other pressure-sensitive adhesive layer (II), then the pressure-sensitive adhesive strength W of the pressure-sensitive adhesive layer (II) has been regulated to a small value in the range of 2-20 N/25 mm and the ratio of the pressure-sensitive adhesive strength S of the pressure-sensitive adhesive layer (I) to the W, S/W, is 1.5 or larger, preferably 2.5 or larger, more preferably 5.0 or larger.

It is preferable that the double-sided pressure-sensitive adhesive tape of the invention should be configured so that both pressure-sensitive adhesive layers differ in composition. Examples of methods for making both surfaces differ in pressure-sensitive adhesive strength include a method in which both pressure-sensitive adhesive layers are formed so as to differ in thickness and a method in which both pressure-sensitive adhesive layers are made to differ in gel fraction. For imparting a difference in gel fraction, use can specifically be made of a method in which acrylic resins (A) which differ in structure or molecular weight are used or pressure-sensitive adhesives differing in the kind or amount of the crosslinker are used. Examples thereof further include a method in which a tackifier is added as an additive or the kind and amount thereof are regulated.

For enhancing pressure-sensitive adhesive strength (corresponding to the pressure-sensitive adhesive layer (I)), it is effective to increase the thickness of the pressure-sensitive adhesive layer. Specifically, the thickness thereof is preferably 50-200 μm, especially preferably 60-150 μM, more preferably 70-130 μm. Also effective is to reduce the amount of the crosslinker to lower the gel fraction. In the case where the crosslinker is an isocyanate-based crosslinker, the use amount thereof per 100 parts by weight of the acrylic resin (A) is preferably 0.1-1 part by weight, especially preferably 0.2-0.5 parts by weight. In the case where the crosslinker is an epoxy-based crosslinker, the use amount thereof per 100 parts by weight of the acrylic resin (A) is preferably 0.01-0.1 part by weight, especially preferably 0.01-0.05 parts by weight. Preferred as the crosslinker to be used for the pressure-sensitive adhesive layer (I), which has a higher pressure-sensitive adhesive strength, are epoxy-based crosslinkers, from the standpoint that the pressure-sensitive adhesive layer is flexible and can retain the holding power. The flexible pressure-sensitive adhesive layer penetrates into interstices among the back-side fibers of the carpet to improve the pressure-sensitive adhesive strength by the anchoring effect. The gel fraction of the pressure-sensitive adhesive layer is preferably 20-60%, especially preferably 25-50%, more preferably 25-40%.

Although the molecular weight or structure of the acrylic resin (A) and the tackifier added thereto exert influences on the pressure-sensitive adhesive strength, these influences are smaller than the influences of gel fraction and the amount of the crosslinker. The weight-average molecular weight of the acrylic resin (A) for the pressure-sensitive adhesive layer having a higher pressure-sensitive adhesive strength is preferably 300,000-1,000,000, especially preferably 500,000-800,000. Using these methods in combination is preferred from the standpoint that the pressure-sensitive adhesive strength can be improved without disturbing the balance with other properties.

Conversely, for reducing pressure-sensitive adhesive strength (corresponding to the pressure-sensitive adhesive layer (II)), it is effective to reduce the thickness of the pressure-sensitive adhesive layer. Specifically, the thickness thereof is preferably 5-50 μm, especially preferably 10-40 μm, more preferably 15-35 μm. Also effective is to increase the amount of the crosslinker to heighten the gel fraction. In the case where the crosslinker is an isocyanate-based crosslinker, the use amount thereof per 100 parts by weight of the acrylic resin (A) is preferably 1-10 parts by weight, especially preferably 1.5-5.0 parts by weight. In the case where the crosslinker is an epoxy-based crosslinker, the use amount thereof per 100 parts by weight of the acrylic resin (A) is preferably 0.1-1 part by weight, especially preferably 0.2-0.5 parts by weight. Preferred as the crosslinker to be used for the pressure-sensitive adhesive layer (II), which has a lower pressure-sensitive adhesive strength, are isocyanate-based crosslinkers, from the standpoint that stable removability is obtained. The gel fraction of the pressure-sensitive adhesive layer is preferably 50-90%, especially preferably 60-90%, more preferably 70-85%.

The weight-average molecular weight of the acrylic resin (A) for the pressure-sensitive adhesive layer (II), which has a lower pressure-sensitive adhesive strength, is preferably 500,000-1,500,000, especially preferably 600,000-1,000,000. It is preferable that the weight-average molecular weight thereof should be equal to or higher than that of the acrylic resin for the pressure-sensitive adhesive layer having a higher pressure-sensitive adhesive strength.

The double-sided pressure-sensitive adhesive tape for fixing aircraft parts of the invention is thus obtained. Since the double-sided pressure-sensitive adhesive tape of the invention including a substrate having hand tearability, as a substrate film this tape can be easily torn by hand at any desired position along the tape TD without using a tape cutter or the like. This tape is excellent also in terms of removability and flame retardance. This tape is hence especially useful as a double-sided pressure-sensitive adhesive tape for, for example, fixing carpets for aircrafts to flooring parts.

EXAMPLES

The present invention will be explained below in more detail by reference to Examples, but the invention should not be construed as being limited to the following Examples unless the invention departs from the spirit thereof. In the following Production Examples, Examples, and Comparative Examples, "parts" and "%" are on the weight basis.

First, acrylic resins were prepared in the following manner. The weight-average molecular weight and glass transition temperature of each acrylic resin were measured in accordance with the methods described above.

A viscosity measurement was made in accordance with 4.5.3, Rotational Viscometer Method of JIS K5400 (1990)

<Method for Producing Acrylic Resins (A)>

Production Example 1

Into a reactor equipped with a thermometer, stirrer, and reflux condenser were introduced 51 parts of 2-ethylhexyl acrylate, 42 parts of butyl acrylate, 5 parts of vinyl acetate, 2 parts of acrylic acid, 40 parts of ethyl acetate, and 0.18 parts of azobisisobutyronitrile as a polymerization initiator. The contents were heated with stirring and polymerized for 7 hours at the reflux temperature of the ethyl acetate. Thereafter, the reaction mixture was diluted with ethyl acetate and toluene to obtain a 50% solution of an acrylic resin (A-1).

The acrylic resin (A-1) obtained had a weight-average molecular weight of 600,000, a dispersity ratio of 5.0, a viscosity of 10,000 mPa·s/25° C., and a glass transition temperature of −59° C.

Production Example 2

Into a reactor equipped with a thermometer, stirrer, and reflux condenser were introduced 88.4 parts of 2-ethylhexyl acrylate, 10 parts of isobornyl acrylate, 0.1 part of 2-hydroxyethyl methacrylate, 1.5 parts of acrylic acid, 40 parts of ethyl acetate, 14.5 parts of acetone, and 0.16 parts of azobisisobutyronitrile as a polymerization initiator. The contents were heated with stirring and polymerized for 7 hours at the reflux temperature of the ethyl acetate. Thereafter, the reaction mixture was diluted with ethyl acetate to obtain a 50% solution of an acrylic resin (A-2).

The acrylic resin (A-2) obtained had a weight-average molecular weight of 550,000, a dispersity ratio of 4.0, a viscosity of 5,000 mPa·s/25° C., and a glass transition temperature of −59° C.

Production Example 3

Into a reactor equipped with a thermometer, stirrer, and reflux condenser were introduced 69 parts of 2-ethylhexyl acrylate, 23 parts of butyl acrylate, 5 parts of vinyl acetate, 0.1 part of 2-hydroxyethyl methacrylate, 2.9 parts of acrylic acid, 40 parts of ethyl acetate, and 0.22 parts of azobisisobutyronitrile as a polymerization initiator. The contents were heated with stirring and polymerized for 7 hours at the reflux temperature of the ethyl acetate. Thereafter, the reaction mixture was diluted with toluene to obtain a 46% solution of an acrylic resin (A-3).

The acrylic resin (A-3) obtained had a weight-average molecular weight of 650,000, a dispersity ratio of 5.8, a viscosity of 7,000 mPa·s/25° C., and a glass transition temperature of −60° C.

Production Example 4

Into a reactor equipped with a thermometer, stirrer, and reflux condenser were introduced 93.8 parts of 2-ethylhexyl acrylate, 3 parts of vinyl acetate, 0.2 parts of 2-hydroxyethyl methacrylate, 3 parts of acrylic acid, 37 parts of ethyl acetate, 14.6 parts of acetone, and 0.15 parts of azobisisobutyronitrile as a polymerization initiator. The contents were heated with stirring and polymerized for 7 hours at the reflux temperature of the ethyl acetate. Thereafter, the reaction mixture was diluted with toluene to obtain a 40% solution of an acrylic resin (A-4).

The acrylic resin (A-4) obtained had a weight-average molecular weight of 600,000, a dispersity ratio of 4.7, a viscosity of 6,000 mPa·s/25° C., and a glass transition temperature of −65° C.

Example 1

To 100 parts, on a solid content, of the acrylic resin (A-1) prepared in Production Example 1 were added 21 parts of tris(tribromoneopentyl) phosphate (trade name "CR-900", manufactured by Daihachi Chemical Industry Co., Ltd.) as a halogen-containing phosphoric ester flame retardant, 15 parts of a rosin-ester tackifier (trade name "Super Ester A-100", manufactured by Arakawa Chemical Industries, Ltd.), 0.014 parts of an epoxy-based crosslinker (trade name "TETRAD C", manufactured by Mitsubishi Gas Chemical Inc.), and an appropriate amount of ethyl acetate. These ingredients were mixed together until the mixture became even. The resultant composition was applied with an applicator to the heavy-release surface of a paper release liner (trade name "SLB-50KWD", manufactured by Sumika-kakoushi Co., Ltd.; base-paper basis weight, 53 g/m$^2$) so as to result in a thickness after the application of 85 μm, and dried at 90° C. for 3 minutes. Thus, a paper release liner (1-1) coated with a pressure-sensitive adhesive layer (I) was produced.

Next, 1.5 parts of an isocyanate-based crosslinker (trade name "Coronate L-55E", manufactured by Nippon Polyurethane Co., Ltd.) and an appropriate amount of ethyl acetate were added to 100 parts, on a solid content, of the acrylic resin (A-3) prepared in Production Example 3. These ingredients were mixed together until the mixture became even. The resultant composition was applied with an applicator to the light-release surface of a paper release liner (trade name "SLB-50KWD", manufactured by Sumika-kakoushi Co., Ltd.; base-paper basis weight, 53 g/m$^2$) so as to result in a thickness after the application of 35 μm, and dried at 90° C. for 2 minutes. Thus, a paper release liner (1-2) coated with a pressure-sensitive adhesive layer (II) was produced.

The pressure-sensitive adhesive side of the paper release liner (1-1) coated with a pressure-sensitive adhesive layer (I) was applied to a laminate of a biaxially stretched polypropylene film and a uniaxially stretched polypropylene film (the laminate being trade name "TORAYFAN BO YT42", manufactured by Toray Industries, Inc.; thickness, 25 μm; end tear resistance, 40.3 N; distance of tearing deviation, 4.8 mm) as a substrate having hand tearability, the laminate being an easy-to-tear film in which both surfaces had undergone a corona treatment. Subsequently, the pressure-sensitive adhesive side of the paper release liner (1-2) coated with a pressure-sensitive adhesive layer (II) was applied to the other surface of the easy-to-tear film. Thereafter, a thermal after-curing treatment was conducted for 7 days in a 40° C. drying machine. Thus, a double-sided pressure-sensitive adhesive tape was obtained.

Example 2

To 100 parts, on a solid content, of the acrylic resin (A-2) prepared in Production Example 2 were added 20 parts of tris(tribromoneopentyl) phosphate (trade name "CR-900", manufactured by Daihachi Chemical Industry Co., Ltd.) as a halogen-containing phosphoric ester flame retardant, 15 parts of a rosin-ester tackifier (trade name "Super Ester A-100", manufactured by Arakawa Chemical Industries, Ltd.), 0.014 parts of an epoxy-based crosslinker (trade name "TETRAD C", manufactured by Mitsubishi Gas Chemical Inc.), and an appropriate amount of ethyl acetate. These ingredients were mixed together until the mixture became even. The resultant composition was applied with an applicator to the heavy-release surface of a paper release liner (trade name "SLB-50KWD", manufactured by Sumika-kakoushi Co., Ltd.; base-paper basis weight, 53 g/m$^2$) so as to result in a thickness after the application of 85 μm, and dried at 90° C. for 3 minutes. Thus, a paper release liner (2-1) coated with a pressure-sensitive adhesive layer (I) was produced.

Next, 20 parts of tris(tribromoneopentyl) phosphate (trade name "CR-900", manufactured by Daihachi Chemical Industry Co., Ltd.) as a halogen-containing phosphoric ester flame retardant, 0.6 parts of an isocyanate-based crosslinker (trade name "Coronate L-55E", manufactured by Nippon Polyurethane Co., Ltd.), and an appropriate amount of ethyl acetate were added to 100 parts, on a solid content, of the acrylic resin (A-4) prepared in Production Example 4. These ingredients were mixed together until the mixture became even. The resultant composition was applied with an applicator to the light-release surface of a paper release liner (trade name "SLB-50KWD", manufactured by Sumika-kakoushi Co., Ltd.; base-paper basis weight, 53 g/m$^2$) so as to result in a thickness after the application of 35 μm, and dried at 90° C. for 2 minutes. Thus, a paper release liner (2-2) coated with a pressure-sensitive adhesive layer (II) was produced.

The pressure-sensitive adhesive side of the paper release liner (2-1) coated with a pressure-sensitive adhesive layer was applied to a biaxially stretched polyester film (trade name "TEARFINE TF110", manufactured by Toyobo Co., Ltd.; thickness, 14 μm; end tear resistance, 43.4 N; distance of tearing deviation, 3.0 mm) as a substrate having hand tearability, the film being an easy-to-tear film. Subsequently, the pressure-sensitive adhesive side of the paper release liner (2-2) coated with a pressure-sensitive adhesive was applied to the other surface of the easy-to-tear film. Thereafter, a thermal after-curing treatment was conducted for 7 days in a 40° C. drying machine. Thus, a double-sided pressure-sensitive adhesive tape was obtained.

Example 3

A double-sided pressure-sensitive adhesive tape was obtained in the same manner as in Example 1, except that 10 parts of an aromatic condensed phosphate ester (trade name "PX-200", manufactured by Daihachi Chemical Industry Co., Ltd.) and 25 parts of aluminum hydroxide (trade name "HIGILITE H-32", manufactured by Showa Denko K.K.) were incorporated in place of the 21 parts of tris(tribromoneopentyl) phosphate used as a halogen-containing phosphoric ester flame retardant.

Example 4

A paper release liner (4-1) coated with a pressure-sensitive adhesive layer (I) was produced in the same manner as in Example 1, except that the amount of the rosin-ester tackifier (trade name "Super Ester A-100", manufactured by Arakawa Chemical Industries, Ltd.) added to 100 parts, on a solid content, of the acrylic resin (A-1) prepared in Production Example 1 was changed to 0 part.

Next, 1.5 parts of an isocyanate-based crosslinker (trade name "Coronate L-55E", manufactured by Nippon Polyurethane Co., Ltd.) and an appropriate amount of ethyl acetate were added to 100 parts, on a solid content, of the acrylic resin (A-4) prepared in Production Example 4. These ingredients were mixed together until the mixture became even. The resultant composition was applied with an applicator to the light-release surface of a paper release liner (trade name "SLB-50KWD", manufactured by Sumika-kakoushi Co., Ltd.; base-paper basis weight, 53 g/m$^2$) so as to result in a thickness after the application of 35 μm, and dried at 90° C. for 2 minutes. Thus, a paper release liner (4-2) coated with a pressure-sensitive adhesive layer (II) was produced.

The pressure-sensitive adhesive side of the paper release liner (4-1) coated with a pressure-sensitive adhesive layer was applied to a synthetic paper which was a laminate of a biaxially stretched polypropylene film and a uniaxially stretched polypropylene film (the synthetic paper being trade name "YUPO MKS 40XX", manufactured by Yupo Corporation; thickness, 48 μm; end tear resistance, 41.2 N; distance of tearing deviation, 2.9 mm), the synthetic paper being an easy-to-tear film. Subsequently, the pressure-sensitive adhesive side of the paper release liner (4-2) coated with a pressure-sensitive adhesive was applied to the other surface of the easy-to-tear film. Thereafter, a thermal after-curing treatment was conducted for 7 days in a 40° C. drying machine. Thus, a double-sided pressure-sensitive adhesive tape was obtained.

Example 5

A double-sided pressure-sensitive adhesive tape was obtained in the same manner as in Example 4, except that the amount of the isocyanate-based crosslinker (trade name "Coronate L-55E", manufactured by Nippon Polyurethane Co., Ltd.) to be incorporated into the pressure-sensitive adhesive layer (II) was changed to 2.0 parts and the thickness of the pressure-sensitive adhesive layer (II) was changed to 25 μm, and that the synthetic paper (trade name "YUPO MKS 40XX", manufactured by Yupo Corporation) of a substrate was replaced with a super-lightweight type substrate (manufactured by Sun A Kaken Co., Ltd.; weight, 47 g/m$^2$; thickness, 62 μm) in which laminating a polyethylene film was laminated to each of both surfaces of a polyethylene flat yarn cloth, as a substrate including a flat yarn cloth.

Example 6

A double-sided pressure-sensitive adhesive tape was obtained in the same manner as in Example 5, except that the substrate including a flat yarn cloth was replaced with a lightweight type substrate (manufactured by Sun A Kaken Co., Ltd.; weight, 75 g/m$^2$; thickness, 86 μm) in which a polyethylene film was laminated to one surface of a polyethylene flat yarn cloth.

Example 7

A double-sided pressure-sensitive adhesive tape was obtained in the same manner as in Example 5, except that the amount of the flame retardant tris(tribromoneopentyl) phosphate (trade name "CR-900", manufactured by Daihachi Chemical Industry Co., Ltd.) to be incorporated into the pressure-sensitive adhesive layer (I) was changed to 50 parts and the thickness of the pressure-sensitive adhesive layer (I) was changed to 110 μm, that the thickness of the pressure-sensitive adhesive layer (II) was changed to 35 µm, and that the substrate including a flat yarn cloth was replaced with an ordinary type substrate (manufactured by DIATEX Co., Ltd.; weight, 112 g/m$^2$; thickness, 130 µm) in which a polyethylene film was laminated to each of both surfaces of a polyethylene flat yarn cloth.

Comparative Example 1

A double-sided pressure-sensitive adhesive tape was obtained in the same manner as in Example 1, except that the tris(tribromoneopentyl) phosphate as a flame retardant was not incorporated.

Comparative Example 2

A double-sided pressure-sensitive adhesive tape was obtained in the same manner as in Example 1, except that a biaxially stretched polypropylene film having no hand tearability (trade name "TORAYFAN BO 2548", manufactured by Toray Industries, Inc.; thickness, 25 µm; end tear resistance, 32.2 N; distance of tearing deviation, 6.5 mm) was used as a substrate.

Comparative Example 3

A double-sided pressure-sensitive adhesive tape was obtained in the same manner as in Example 1, except that the amount of the flame retardant tris(tribromoneopentyl) phosphate (trade name "CR-900", manufactured by Daihachi Chemical Industry Co., Ltd.) to be incorporated into the pressure-sensitive adhesive layer (I) was changed to 25 parts, that the composition for forming the pressure-sensitive adhesive layer (II) was replaced with a composition in which 25 parts of tris(tribromoneopentyl) phosphate (trade name "CR-900", manufactured by Daihachi Chemical Industry Co., Ltd.) as a halogen-containing phosphoric ester flame retardant and 0.014 parts of an epoxy-based crosslinker (trade name "TETRAD C", manufactured by Mitsubishi Gas Chemical Co., Ltd.) were added to 100 parts, on a solid content, of the acrylic resin (A-1), that the thickness of the pressure-sensitive adhesive layer (II) was changed to 85 µm, and that the ultra-lightweight substrate including a flat yarn cloth which had been used in Example 5 was used as a substrate.

Comparative Example 4

A double-sided pressure-sensitive adhesive tape was obtained in the same manner as in Example 4, except that the amount of the flame retardant tris(tribromoneopentyl) phosphate (trade name "CR-900", manufactured by Daihachi Chemical Industry Co., Ltd.) to be incorporated into the pressure-sensitive adhesive layer (I) was changed to 30 parts, and that a nonwoven fabric (manufactured by Daifuku Paper MFG. Co., Ltd.; weight, 18 g/m$^2$; thickness, 62 µm) was used as a substrate.

The double-sided pressure-sensitive adhesive tapes thus obtained were examined and evaluated for hand tearability, end tear resistance, distance of tearing deviation, tensile strength, adhesive strength, flame retardance, tape weight, and removability by the methods described below. The results of these examinations and the results of evaluation are shown in Table 1 and Table 2 which will be given later.
[Hand Tearability]

Each double-sided pressure-sensitive adhesive tape was cut into a width of 50 mm. The release liner in which the light-release surface of the release liner was in contact with the pressure-sensitive adhesive layer was peeled off, and the end surface which had been in contact was pinched with the fingers and torn by hand in the TD. The ease of tearing was evaluated in accordance with the following.
(Evaluation Criteria)
Good . . . The substrate suffers no elongation and can be torn linearly at any desired position.
Poor . . . The substrate suffers elongation, tears irregularly, or is unable to be torn.
[End Tear Resistance]

Each double-sided pressure-sensitive adhesive tape was cut into a size of 100 mm (TD)×150 mm (MD). The release liner in which the light-release surface of the release liner was in contact with the pressure-sensitive adhesive layer was peeled off, and a 10-mm incision extending in the TD was formed with a cutter at a position of 75 mm, which was at the center along the MD. Thus, a test film was obtained.

The test film obtained was fixed with a fixture regulated so as to have a chuck-to-chuck distance of 100 mm, and stretched with a tensile tester (AG-IS, manufactured by Shimadzu Corp.) at a speed of 100 mm/min to the position where the crosshead distance was 50 mm. The force (N) required at the time of tearing was measured.

Three specimens were thus tested in the same manner, and a maximum value thereof was taken as end tear resistance and evaluated in accordance with the following.
(Evaluation Criteria)
Good . . . less than 200 N
Poor . . . 200 N or higher
[Distance of Tearing Deviation]

Each double-sided pressure-sensitive adhesive tape was cut into a size of 100 mm (TD)×150 mm (MD). The release liner in which the light-release surface of the release liner was in contact with the pressure-sensitive adhesive layer was peeled off, and a 10-mm incision extending in the TD from an end of the tape was formed with a cutter at a position of 75 mm, which was at the center along the MD. Thus, a test film was obtained. The position along the MD where the incision was formed is referred to as zero position (X).

Figure 1:
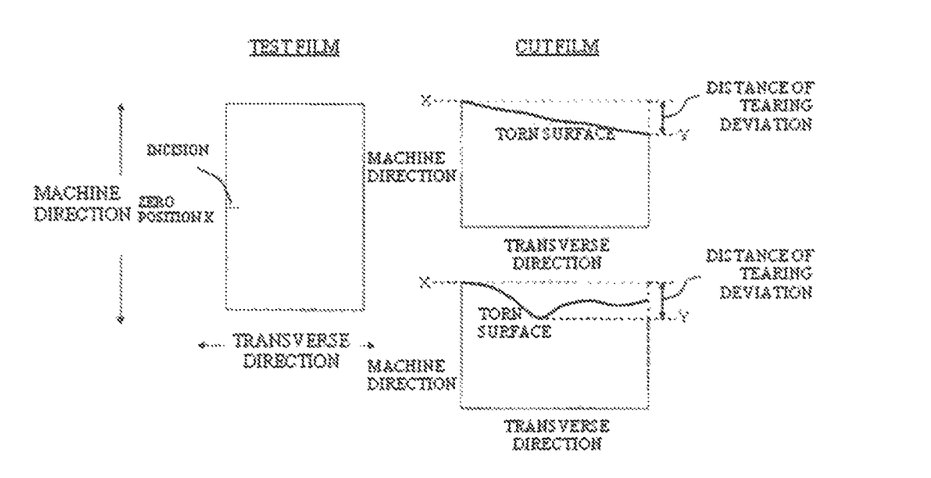
FIG. 1 shows a method for measuring the distance of tearing deviation of a film.

The test film obtained was cut in the same manner as in the end tear resistance test, and the cut test film (tape substrate only) was examined for the distance (Y) over which the cut surface was most apart in the MD from the zero position (X) was measured, as shown in FIG. 1.

Three specimens were thus tested in the same manner, and a maximum value of the distance (Y) was taken as the distance of tearing deviation and evaluated in accordance with the following.
(Evaluation Criteria)
Good . . . less than 6 mm/100 mm
Poor . . . 6 mm/100 mm or larger
[Tensile Strength]

Each double-sided pressure-sensitive adhesive tape was cut into a size of 25 mm (width)×150 mm (length) to produce a test film. This test piece was cut off so that the length direction of this test piece was parallel with the MD of the film. The release liners in contact with the pressure-sensitive adhesive layer (I) and the pressure-sensitive adhesive layer (II) of the test film obtained were peeled off. This film was fixed to a fixture regulated so as to have a chuck-to-chuck distance of 100 mm, and stretched with a tensile tester (AG-IS, manufactured by Shimadzu Corp.) at a speed of 50 mm/min to measure the force (N) required at the time of film breaking.

Three test films were subjected to the same measurement, and an average value thereof was taken as tensile strength.

[Pressure-Sensitive Adhesive Strength]

The back surface of the pressure-sensitive adhesive layer of each double-sided pressure-sensitive adhesive tape which was to be examined for pressure-sensitive adhesive strength was lined with a polyester film having a thickness of 25 μm ("Lumirror S10", manufactured by Toray Industries, Inc.), and this laminate was cut into a size of 25 mm (width)×150 mm (length) to obtain a test piece.

Subsequently, an test plate of SUS304 steel plate was used as an adherend, and the test piece was press-bonded to this test plate by rolling a roller with a weight of 2 kg forward and backward twice thereon at a crimp speed of 10 mm/s. After the crimp, the resultant specimen was allowed to stand for 20 minutes. The free portion of the test piece was folded back at 180° and peeled off over 30 mm. Thereafter, the test plate was fixed to the lower chuck of the tensile tester and the end of the test piece was fixed to the upper chuck, and the double-sided pressure-sensitive adhesive tape was peeled from the adherend at a speed of 300 mm/min to measure the pressure-sensitive adhesive strength.

[Flame Retardance]

A test in accordance with the flammability test as provided for in 14CFR Part 25 Appendix F Part I Section (a)(1)(ii) was conducted to assess whether each double-sided pressure-sensitive adhesive tape passed or failed.

[Tape Weight]

Each double-sided pressure-sensitive adhesive tape was cut into a size of 100 mm (width)×100 mm (length). The release liners were peeled off, and the weight of this tape was measured with a balance. The 100-fold value of the measured value was taken as tape weight (g/m$^2$).

[Removability]

The back surface of the pressure-sensitive adhesive layer of each double-sided pressure-sensitive adhesive tape which was to be examined for pressure-sensitive adhesive strength was lined with a polyester film having a thickness of 25 μm ("Lumirror S10", manufactured by Toray Industries, Inc.), and this laminate was cut into a size of 25 mm (width)×150 mm (length) to obtain a test piece.

Subsequently, an test plate of SUS304 steel plate was used as an adherend, and the test piece was press-bonded to this test plate by rolling a roller with a weight of 2 kg forward and backward twice thereon at a crimp speed of 10 mm/s. After the crimp, the test piece press-bonded to the SUS304 steel plate was allowed to stand for 20 minutes, subsequently placed for 500 hours in an oven set at 70° C., and allowed to stand for 30 minutes in an environmental temperature of 23° C. and a humidity of 50%. Thereafter the free portion of the test piece was folded back at 180° and peeled off over 30 mm. Subsequently, the test plate was fixed to the lower chuck and the end of the test piece was fixed to the upper chuck, and the double-sided pressure-sensitive adhesive tape was peeled from the adherend at a speed of 300 mm/min to visually determine whether the pressure-sensitive adhesive layer of the test piece remained on the SUS304 steel plate as the adherend.

Good: The pressure-sensitive adhesive was cleanly peeled off without remaining on the adherend.

Poor: The pressure-sensitive adhesive remained on the adherend.

The pressure-sensitive adhesive layers (I) in Examples 1 to 7 and Comparative Examples 1, 2, and 4 had gel fractions of 30-32%, while the pressure-sensitive adhesive layers (II) therein had gel fractions of 78-82%. The pressure-sensitive adhesive layers (I) and (II) in Comparative Example 3 each had a gel fraction of 30-32%. In each examination, the pressure-sensitive adhesive layer (I) or (II) was coated and applied on only one side of a substrate, and this specimen was subjected to 7-day thermal aging in a 40° C. drying machine and then examined.

TABLE 1

| | | | Example 1 | | Example 2 | | Example 3 | | Example 4 | |
|---|---|---|---|---|---|---|---|---|---|---|
| Substrate | | Material | easy-to-tear film | | easy-to-tear film | | easy-to-tear film | | easy-to-tear film (synthetic paper) | |
| | | Trade name | TORAYFAN BO YT42 | | TEARFINE TF110 | | TORAYFAN BO YT42 | | YUPO MKS 40XX | |
| | | Hand tearability | Good | | Good | | Good | | Good | |
| | | Weight (g/m$^2$) | 23 | | 18 | | 23 | | 41 | |
| | | Thickness (μm) | 25 | | 14 | | 25 | | 48 | |
| | | End tear resistance (N) | 40.3 | | 43.4 | | 40.3 | | 41.2 | |
| | | Tearing deviation (mm/100 mm) | 4.8 | | 3 | | 4.8 | | 2.9 | |
| | | | Name, etc. | Compounding ratio | Name, etc. | Compounding ratio | Name, etc. | Compounding ratio | Name, etc. | Compounding ratio |
| Composition | Pressure-sensitive adhesive layer (I) | Acrylic resin | A-1 | 100 | A-2 | 100 | A-1 | 100 | A-1 | 100 |
| | | Flame retardant | CR-900 | 21 | CR-900 | 20 | PX-200 HIGILITE H-32 | 10 25 | CR-900 | 21 |
| | | Tackifier | Super Ester A-100 | 15 | Super Ester A-100 | 15 | Super Ester A-100 | 15 | Super Ester A-100 | 0 |
| | | Crosslinker | TETRAD C | 0.014 | TETRAD C | 0.014 | TETRAD C | 0.014 | TETRAD C | 0.014 |
| | | Thickness (μm) | 85 | | 85 | | 85 | | 85 | |
| | | | Name, etc. | Compounding ratio | Name, etc. | Compounding ratio | Name, etc. | Compounding ratio | Name, etc. | Compounding ratio |
| | Pressure-sensitive adhesive layer (II) | Acrylic resin | A-3 | 100 | A-4 | 100 | A-3 | 100 | A-4 | 100 |
| | | Flame retardant | none | 0 | CR-900 | 20 | none | 0 | none | 0 |
| | | Crosslinker | Coronate L-55E | 1.5 | Coronate L-55E | 0.6 | Coronate L-55E | 1.5 | Coronate L-55E | 1.5 |

TABLE 1-continued

|  |  |  |  |  |  |
|---|---|---|---|---|---|
|  | Thickness (μm) | 35 | 35 | 35 | 35 |
| Property | Flame retardance | Pass | Pass | Pass | Pass |
|  | Tape weight (g/m$^2$) | 151 | 152 | 162 | 173 |
|  | Hand tearability | Good | Good | Good | Good |
|  | End tear resistance (N) | 176 | 186 | 175 | 189 |
|  | Tearing deviation (mm/100 mm) | 2.4 | 4.9 | 2.7 | 4.8 |
|  | Tensile strength (N/25 mm) | 39 | 29 | 37 | 65 |
| Pressure-sensitive adhesive force (N/25 mm) | Pressure-sensitive adhesive layer (I) (S) | 42 | 38 | 41 | 40 |
|  | Pressure-sensitive adhesive layer (II) (W) | 13.7 | 7.5 | 13.9 | 14.2 |
|  | S/W | 3.1 | 5.1 | 2.9 | 2.8 |
|  | Removability (adhesive remaining) | Good | Good | Good | Good |

|  |  |  | Example 5 | Example 6 | Example 7 |
|---|---|---|---|---|---|
| Substrate | Material |  | substrate including flat yarn cloth | substrate including flat yarn cloth | substrate including flat yarn cloth |
|  | Trade name |  |  |  |  |
|  | Hand tearability |  | Good | Good | Good |
|  | Weight (g/m$^2$) |  | 47 | 75 | 112 |
|  | Thickness (μm) |  | 62 | 86 | 130 |
|  | End tear resistance (N) |  |  |  |  |
|  | Tearing deviation (mm/100 mm) |  |  |  |  |

|  |  |  | Name, etc. | Compounding ratio | Name, etc. | Compounding ratio | Name, etc. | Compounding ratio |
|---|---|---|---|---|---|---|---|---|
| Composition | Pressure-sensitive adhesive layer (I) | Acrylic resin | A-1 | 100 | A-1 | 100 | A-1 | 100 |
|  |  | Flame retardant | CR-900 | 21 | CR-900 | 21 | CR-900 | 50 |
|  |  | Tackifier | Super Ester A-100 | 0 | Super Ester A-100 | 0 | Super Ester A-100 | 0 |
|  |  | Crosslinker | TETRAD C | 0.014 | TETRAD C | 0.014 | TETRAD C | 0.014 |
|  |  | Thickness (μm) | 85 |  | 85 |  | 110 |  |

|  |  |  | Name, etc. | Compounding ratio | Name, etc. | Compounding ratio | Name, etc. | Compounding ratio |
|---|---|---|---|---|---|---|---|---|
|  | Pressure-sensitive adhesive layer (II) | Acrylic resin | A-4 | 100 | A-4 | 100 | A-4 | 100 |
|  |  | Flame retardant | none | 0 | none | 0 | none | 0 |
|  |  | Crosslinker | Coronate L-55E | 2.0 | Coronate L-55E | 2.0 | Coronate L-55E | 2.0 |
|  |  | Thickness (μm) | 25 |  | 25 |  | 35 |  |

|  |  |  |  |  |  |
|---|---|---|---|---|---|
| Property | Flame retardance |  | Pass | Pass | Pass |
|  | Tape weight (g/m$^2$) |  | 171 | 198 | 297 |
|  | Hand tearability |  | Good | Good | Good |
|  | End tear resistance (N) |  |  |  |  |
|  | Tearing deviation (mm/100 mm) |  |  |  |  |
|  | Tensile strength (N/25 mm) |  | 90 | 84 | 184 |
| Pressure-sensitive adhesive force (N/25 mm) | Pressure-sensitive adhesive layer (I) (S) |  | 45 | 46 | 48 |
|  | Pressure-sensitive adhesive layer (II) (W) |  | 5.5 | 6.0 | 7.8 |
|  | S/W |  | 8.2 | 7.7 | 6.2 |
|  | Removability (adhesive remaining) |  | Good | Good | Good |

TABLE 2

|  |  | Comparative Example 1 | Comparative Example 2 | Comparative Example 3 | Comparative Example 4 |
|---|---|---|---|---|---|
| Substrate | Material | easy-to-tear film | non-easy-to-tear film | substrate including flat yarn cloth | nonwoven fabric |
|  | Trade name | TORAYFAN BO YT42 | TORAYFAN BO 2548 |  |  |
|  | Hand tearability | Good | Poor | Good | Good |
|  | Weight (g/m$^2$) | 23 | 23 | 47 | 18 |
|  | Thickness (μm) | 25 | 25 | 62 | 62 |
|  | End tear resistance (N) | 40.3 | 32.2 |  |  |
|  | Tearing deviation (mm/100 mm) | 4.8 | 6.5 |  |  |

TABLE 2-continued

|  |  |  | Comparative Example 1 | | Comparative Example 2 | | Comparative Example 3 | | Comparative Example 4 | |
| --- | --- | --- | --- | --- | --- | --- | --- | --- | --- | --- |
|  |  |  | Name, etc. | Compounding ratio | Name, etc. | Compounding ratio | Name, etc. | Compounding ratio | Name, etc. | Compounding ratio |
| Composition | Pressure-sensitive adhesive layer (I) | Acrylic resin | A-1 | 100 | A-1 | 100 | A-1 | 100 | A-1 | 100 |
|  |  | Flame retardant | none | 0 | CR-900 | 21 | CR-900 | 25 | CR-900 | 30 |
|  |  | Tackifier | Super Ester A-100 | 15 | Super Ester A-100 | 15 | Super Ester A-100 | 15 | Super Ester A-100 | 0 |
|  |  | Crosslinker | TETRAD C | 0.014 | TETRAD C | 0.014 | TETRAD C | 0.014 | TETRAD C | 0.014 |
|  |  | Thickness (μm) | 85 | | 85 | | 85 | | 85 | |
|  |  |  | Name, etc. | Compounding ratio | Name, etc. | Compounding ratio | Name, etc. | Compounding ratio | Name, etc. | Compounding ratio |
|  | Pressure-sensitive adhesive layer (II) | Acrylic resin | A-3 | 100 | A-3 | 100 | A-1 | 100 | A-4 | 100 |
|  |  | Flame retardant | none | 0 | none | 0 | CR-900 | 25 | none | 0 |
|  |  | Crosslinker | Coronate L-55E | 1.5 | Coronate L-55E | 1.5 | TETRAD C | 0.014 | Coronate L-55E | 1.5 |
|  |  | Thickness (μm) | 35 | | 35 | | 85 | | 35 | |
| Property |  | Flame retardance | Fail | | Pass | | Pass | | Fail | |
|  |  | Tape weight (g/m$^2$) | 138 | | 151 | | 307 | | 165 | |
|  |  | Hand tearability | Good | | Poor | | Good | | Good | |
|  |  | End tear resistance (N) | 169 | | 255 | | | | | |
|  |  | Tearing deviation (min/100 mm) | 2.6 | | 4.5 | | | | | |
|  |  | Tensile strength (mm/25 mm) | 38 | | 94 | | 249 | | 36 | |
| Pressure-sensitive adhesive force (N/25 mm) | | Pressure-sensitive adhesive layer (I) (S) | 44 | | 40 | | 50 | | 35 | |
|  |  | Pressure-sensitive adhesive layer (II) (W) | 13.5 | | 12.8 | | 47 | | 28.1 | |
|  |  | S/W | 3.3 | | 3.1 | | 1.1 | | 1.2 | |
|  |  | Removability (adhesive remaining) | Good | | Good | | Poor | | Poor | |

It can be seen from the results of the evaluation that the double-sided pressure-sensitive adhesive tapes of Examples 1 to 4, in each of which an easy-to-tear film is used as the substrate film and a flame retardant has been incorporated into the pressure-sensitive adhesive layer(s), passes the flammability test, can be easily torn by hand, require only slight force for tearing, and can be torn so as to result in clean torn surfaces. In addition, these double-sided pressure-sensitive adhesive tapes each have a tape weight of 200 g/m$^2$ or less and have attained a reduction in weight. Furthermore, due to the difference in pressure-sensitive adhesive strength between the two pressure-sensitive adhesive layers respectively on both sides, each double-sided pressure-sensitive adhesive tape showed no adhesive remaining and satisfactory removability in the removability evaluation while retaining sufficient pressure-sensitive adhesive strength. In particular, in Example 4, an easy-to-tear film having a moderate tensile strength is used, and the double-sided pressure-sensitive adhesive tape is not torn when applied to adherends or peeled from the adherends and can be handled efficiently. Also with respect to Examples 5 to 7, in which substrates including a flat yarn cloth are used as the substrates, the tapes pass the flammability test and have satisfactory hand tearability and tape weights of 300 g/m$^2$ or less. In particular, with respect to Examples 5 and 6, in which lightweight substrates including a flat yarn cloth are used, it can be seen that the double-sided pressure-sensitive adhesive tapes each have a tape weight of 200 g/m$^2$ or less to attain a reduction in weight, and that there is a difference in pressure-sensitive adhesive strength between the two pressure-sensitive adhesive layers and each double-sided pressure-sensitive adhesive tape shows no adhesive remaining and excellent removability in the removability evaluation. In addition, each double-sided pressure-sensitive adhesive tape has a high tensile strength, and is not torn when applied to adherends or peeled from the adherends, and can be handed efficiently.

Meanwhile, the double-sided pressure-sensitive adhesive tape of Comparative Example 1, in which an easy-to-tear film was used as the substrate and no flame retardant had been incorporated into the pressure-sensitive adhesive layers, was able to be easily torn by hand, required only slight force for tearing, and was able to be torn so as to result in clean torn surfaces. However, it can be seen that this double-sided pressure-sensitive adhesive tape does not pass the flammability test and is unsuitable for use as a double-sided pressure-sensitive adhesive tape for fixing aircraft parts, which is required to have severe flame retardance.

The double-sided pressure-sensitive adhesive tape of Comparative Example 2, in which an ordinary film that is not an easy-to-tear film was used as the substrate, had a tape weight of 200 g/m$^2$ or less but could not be torn by hand, required a large burden for tearing, and could not be torn so as to result in clean torn surfaces. It can be seen that this tape is unsuitable for use as a double-sided pressure-sensitive adhesive tape for fixing aircraft parts.

In Comparative Example 3, the substrate including a flat yarn cloth was used as the substrate, the pressure-sensitive adhesives same on composition were used to form the two pressure-sensitive adhesive layers respectively on both sides and the thicknesses of the two pressure-sensitive adhesive layers were same, thereby the two pressure-sensitive adhesive layers had no difference in pressure-sensitive adhesive strength therebetween, showed adhesive remaining in the removability test. It can be seen that this tape is unsuitable for use as a double-sided pressure-sensitive adhesive tape for fixing aircraft parts.

The double-sided pressure-sensitive adhesive tape of Comparative Example 4, in which a nonwoven fabric was used as the substrate, did not pass the flammability test although a flame retardant whose amount was not smaller than in the Examples had been incorporated into one of the pressure-sensitive adhesive layers. In cases when the flame retardant amount is increased in order to improve the flame retardance, the tape weight is expected to increase. Although the pressure-sensitive adhesives used as the two pressure-sensitive adhesive layers had the same compositions as in an Example, the two pressure-sensitive adhesive layers have a reduced difference in pressure-sensitive adhesive strength therebetween, probably because the pressure-sensitive adhesive of the pressure-sensitive adhesive layer (I) and the pressure-sensitive adhesive of the pressure-sensitive adhesive layer (II) have partly passed through the substrate and mixed with each other or probably because the crosslinkers or other components in the pressure-sensitive adhesive layers have moved. This double-sided pressure-sensitive adhesive tape hence shows adhesive remaining in the removability evaluation. It can be seen that this tape is unsuitable for use as a double-sided pressure-sensitive adhesive tape for fixing aircraft parts.

This application is based on a Japanese patent application filed on Dec. 27, 2013 (2013-270938), the entire contents thereof being incorporated herein by reference. All the references cited herein are incorporated herein as a whole.

INDUSTRIAL APPLICABILITY

The double-sided pressure-sensitive adhesive tape of the invention is excellent in terms of hand tearability, flame retardance, and removability and hence is suitable for use in applications where aircraft parts are fixed therewith, for example, in the fixing of carpets.

The invention claimed is:

1. A double-sided pressure-sensitive adhesive tape for fixing aircraft parts comprising a first pressure-sensitive adhesive layer (I) on a first side of a substrate having hand tearability and a second pressure-sensitive adhesive layer (II) on a second side of the substrate, wherein when S represents an pressure-sensitive adhesive strength of the first pressure-sensitive adhesive layer (I) and W represents an pressure-sensitive adhesive strength of the second pressure-sensitive adhesive layer (II), the W is 2-20 N/25 mm and S/W is 1.5 or larger, and the double-sided pressure-sensitive adhesive tape passes the flammability test as provided for in FAR25.853(a)app.F.Part1(a)(1)ii, the first pressure-sensitive adhesive layer (I) contains a flame the second, and pressure-sensitive adhesive layer (II) contains no flame retardant, wherein the gel fraction of the first pressure-sensitive adhesive layer (I) is different from the gel fraction of the second pressure-sensitive adhesive layer (II), wherein the gel fraction of the second pressure-sensitive adhesive layer is 50 to 90%.

2. The double-sided pressure-sensitive adhesive tape for fixing aircraft parts according to claim 1, wherein the substrate is an easy to tear film.

3. The double-sided pressure-sensitive adhesive tape for fixing aircraft parts according to claim 2, wherein the easy to tear film is made of a material which is a polyester film or a polyolefin film.

4. The double-sided pressure-sensitive adhesive tape for fixing aircraft parts according to claim 2, wherein the easy to tear film is a biaxially stretched film in which the transverse-direction stretch ratio is higher than the machine-direction stretch ratio.

5. The double-sided pressure-sensitive adhesive tape for fixing aircraft parts according to claim 2, wherein the easy to tear film is a laminate of a biaxially stretched film and a monoaxially stretched film.

6. The double-sided pressure-sensitive adhesive tape for fixing aircraft parts according to claim 1, wherein the substrate is a substrate which comprises a flat yarn cloth.

7. The double-sided pressure-sensitive adhesive tape for fixing aircraft parts according to claim 6, wherein the substrate comprising a flat yarn cloth is a laminated film in which a flat yarn cloth and a plastic film are laminated.

8. The double-sided pressure-sensitive adhesive tape for fixing aircraft parts according to claim 1, wherein the first and the second pressure sensitive adhesive layers comprise an acrylic resin.

9. The double-sided pressure-sensitive adhesive tape for fixing aircraft parts according to claim 1, wherein the content of the flame retardant is 70% by weight or less based on the total weight of the pressure-sensitive adhesive layers (I) and (II).

10. The double-sided pressure-sensitive adhesive tape for fixing aircraft parts according to claim 1, wherein a release liner made of paper is coated on the surface of at least one of the pressure-sensitive adhesive layers, the surface is on the reverse side from the substrate, and the base paper of the release liner has a basis weight of 40-120 g/m$^2$.

11. The double-sided pressure-sensitive adhesive tape for fixing aircraft parts according to claim 1, wherein the gel fraction of the pressure-sensitive adhesive layer (I) is 20 to 60%.

* * * * *